US008947355B1

(12) United States Patent
Karakotsios

(10) Patent No.: US 8,947,355 B1
(45) Date of Patent: Feb. 3, 2015

(54) MOTION-BASED CHARACTER SELECTION

(75) Inventor: Kenneth M. Karakotsios, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 584 days.

(21) Appl. No.: 12/732,062

(22) Filed: Mar. 25, 2010

(51) Int. Cl.
*G09G 5/08* (2006.01)

(52) U.S. Cl.
USPC ............................................ 345/158; 345/156

(58) Field of Classification Search
USPC ........................................................ 345/166
See application file for complete search history.

(56) References Cited

U.S. PATENT DOCUMENTS

| 6,011,542 | A | * | 1/2000 | Durrani et al. | 345/156 |
|---|---|---|---|---|---|
| 6,501,464 | B1 | * | 12/2002 | Cobbley et al. | 345/173 |
| 2002/0149569 | A1 | * | 10/2002 | Dutta et al. | 345/173 |
| 2002/0180799 | A1 | * | 12/2002 | Peck et al. | 345/784 |
| 2002/0190947 | A1 | * | 12/2002 | Feinstein | 345/158 |
| 2006/0146009 | A1 | * | 7/2006 | Syrbe et al. | 345/156 |
| 2006/0192775 | A1 | * | 8/2006 | Nicholson et al. | 345/211 |
| 2008/0126073 | A1 | * | 5/2008 | Longe et al. | 704/1 |
| 2009/0153466 | A1 | * | 6/2009 | Tilley | 345/156 |
| 2009/0196460 | A1 | * | 8/2009 | Jakobs et al. | 382/103 |
| 2009/0307601 | A1 | * | 12/2009 | Kumhyr et al. | 715/741 |

OTHER PUBLICATIONS

Cornell, J., "Does This Headline Know You're Reading It?" h+ Magazine, Mar. 19, 2010, located at <http://hplusmagazine.com/articles/ai/does-headline-know-you%E2%80%99re-reading-it>, last accessed on Jun. 7, 2010, 4 pages.
Thomas, J.T.P. et al., "Near Infrared Light Absorption in the Human Eye Media," *Vision Res.*, 1997, vol. 37, No. 2, pp. 249-253.

* cited by examiner

*Primary Examiner* — Van Chow
(74) *Attorney, Agent, or Firm* — Novak Druce Connolly Bove + Quigg LLP

(57) ABSTRACT

Various interfaces and control schemes are provided that enable a user to enter text or select specific elements of an interface based at least in part upon relative motion. In some embodiments, a user can enter text by tilting a device to locate a specific character, and press on a button or specified area of a device to select that character. In other embodiments, a user can select a character by looking at a character and performing a selection action, a user device able to determine the character by tracking a gaze direction of the user. Any relative movement of a device and/or a user can be used as input, allowing for one-handed or even hands-free entrance of text or other selection of elements of a graphical user interface.

29 Claims, 9 Drawing Sheets

MOTION-BASED CHARACTER SELECTION

BACKGROUND

As the variety of available computing devices increases, and as the size of many of these devices decreases, there comes a need to adapt the ways in which users interface with these computing devices. For example, while typing on a keyboard is an easy and acceptable way for many users to input information for a desktop computer, trying to enter information on a keyboard of a portable phone can be difficult due to the small form factor of the device. For example, the size of a user's fingers can prevent that user from easily pressing one key at a time. Further, as many of these devices move to touch screens or other such input devices, the size of a user's finger can also inhibit the user from successfully selecting an intended object or element on the screen, etc. Another disadvantage to using such touch screens is that fingerprints, dirt, smudges, and other remnants are left on the display screen, which can cause glare or other issues with clarity and/or visibility. Some users add an extra layer of protective material to prevent damage to the screen, but these devices can reduce touch sensitivity and amplify the negative effects of the residue left on the screen.

Further, many users prefer to use portable devices such as cellular phones, personal digital assistants (PDAs), and electronic book reading devices with one hand, and such operation becomes difficult using a touch screen or multiple-button input approach. Even for stationary devices (e.g., desktop computers) the standard keyboard and mouse-based approach can be undesirable for certain users.

BRIEF DESCRIPTION OF THE DRAWINGS

Various embodiments in accordance with the present disclosure will be described with reference to the drawings, in which.

DETAILED DESCRIPTION

Figure 1:
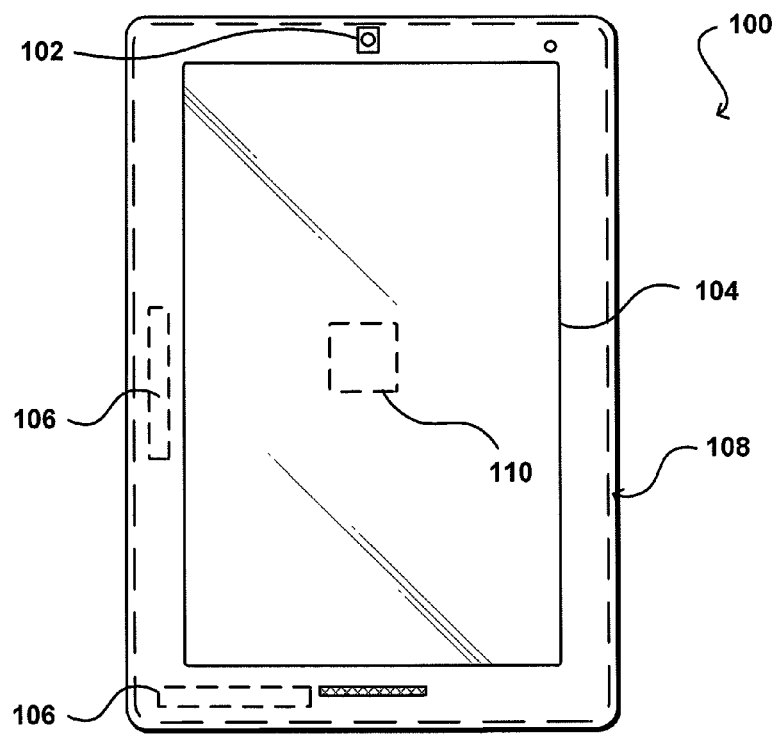
FIG. 1 illustrates an example device including components that can be used to provide input in accordance with various embodiments.

Systems and methods in accordance with various embodiments of the present disclosure may overcome one or more of the aforementioned and other deficiencies experienced in conventional approaches to interacting with a display, interface, or other presentation of content in an electronic environment. Systems and methods in accordance with various embodiments enable users to enter characters, text, or other such information using any of a variety of different interfaces, at least some of which can be used with motion-based control in accordance with various embodiments. For example, a user of a handheld device can control a cursor or other selection element of an interface by changing an orientation or position of the device, and/or by moving or otherwise changing an aspect of the user with respect to the device.

In some embodiments, a user can manipulate a selection element of an interface by changing an orientation of the device, such as by tilting or translating the device. The tilting can be determined using an orientation-determining element of the device, such as an accelerometer or gyro element, or can be determined by imaging and tracking a relative position of the user, as captured by an imaging element of the device. The user can perform a selection action, such as to select a character currently associated with a position of the selection element, by pressing a button on the device, activating an input element, or performing another such action. If the device has a touch-sensitive casing, the user can generate certain inputs by performing specific motions with respect to the device. For example, a user can tap on the device to select the current character, and can make a swiping motion across the device in order to delete the previous character.

Such interfaces also can be used with stationary or other such devices, where motion control can be based upon motions or actions of a user with respect to the device. At least one imaging or detection element of the stationary device can track the relative position of the user as discussed above. In some embodiments, the stationary device also can track a gaze direction of the user. The user then can select characters or other interface elements at least in part by gazing and the desired element.

A wide variety of interfaces can be provided that can be controlled using relative motion, and that provide for quick and easy selection of interface elements. In some embodiments, characters are positioned alphabetically about a wheel, along a character bar, or in another such arrangement that can be easily recognizable for a user. A user can move a selection element over the characters in some embodiments using a coarse adjustment, which enables the user to quickly navigate towards an element of interest, and then using a fine adjustment, which allows the user to accurately select the intended element.

Other interfaces utilize conventional layouts, such as a standard layout for a QWERTY keyboard, but enable the user to easily select characters in a potentially limited space. In some embodiments, only a portion of the layout is displayed at any time. In other embodiments, a substantially transparent character layout can appear as needed, such that the user can still view at least a significant portion of the content displayed on the screen.

In some embodiments the user is able to configure or select the type of interface presented, and the types of input utilized. In some embodiments, the device can alter the interface or input methods based on specific user interactions. For example, if a user is no longer looking at the screen of a device, the device might lock out selection based on gaze detection and might switch to an audio-based selection method. If the device is suddenly in the dark, such as when the device is placed in a pocket, inputs such as touch selection and gaze tracking can be disabled.

Many other alternatives and variations are described and suggested below in relation to at least some of the various embodiments.

FIG. 1 illustrates an example of a portable computing device 100 that can be used with various embodiments discussed herein. This example relates to a portable device that includes a display screen 104, touch-sensitive or otherwise, which can display various graphical elements as part of a graphical user interface (GUI) that can enable the user to input various characters or text, or provide another such input, using various approaches discussed herein. The portable device can include various other input elements, such as at least one orientation-determining element 106 (e.g., an accelerometer or gyro element) that can be used to determine motion and/or a change in orientation of the device. The device also can include at least one image capture element 102 (e.g., a digital still camera or video camera) for capturing image information, in a direction toward or away from a user of the device. While the imaging device is described herein with respect to an ambient light camera, it should be understood that other elements such as an infrared (IR) emitter and detector configuration, or other such imaging elements, can be used within the scope of the various embodiments. The imaging element(s) can be positioned on the device in locations that are least likely to interfere with the user's comfortable operation of the device. As discussed, using multiple input mechanisms can help to interpret information captured about the user, such as to distinguish the movement of a user's head versus movement of the computing device.

The device also can include at least one other user input mechanism, such as at least one pressable button 110 at any appropriate location on the device, such as on the bottom front as in conventional devices (e.g, as part of a keyboard or keypad), or on the side or back of the device (as shown) such that a user holding the device with one hand would likely be able to press or otherwise activate the button without having to shift hand position. In other embodiments, the device can have a touch-sensitive casing 108, or a touch sensitive material over at least a portion of the exterior of the device. By positioning the touch-sensitive material on the back and/or sides of the device, for example, a user can provide input by tapping or sliding a finger with respect to the casing, or performing another such motion. Thus the user can hold the device in one hand and interact with the device by performing an input action at an appropriate location on the device that is most comfortable for the user. Since many users will hold the device in different ways, and will have different hand sizes and other variations, the ability to interact with the device in various locations can be advantageous. Various other input elements can be used as well as known in the art of subsequently developed, such as audio input using a speaker element, etc.

Figure 2:
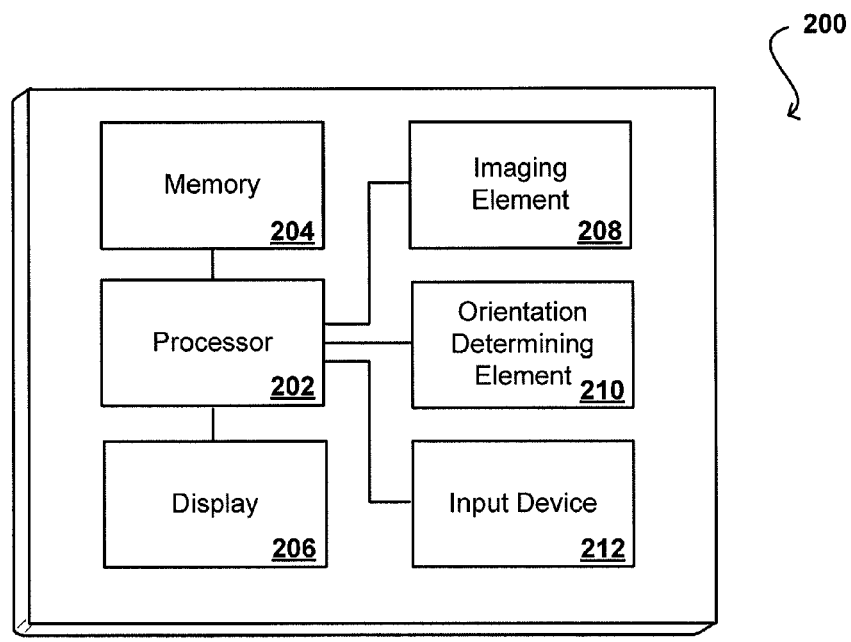
FIG. 2 illustrates an example component-level view of a device that can be used in accordance with various embodiments.

FIG. 2 illustrates a set of basic components of a computing device 200 such as the device 100 described with respect to FIG. 1. In this example, the device includes a processor 202 for executing instructions that can be stored in a memory device or element 204. As known in the art, the device can include many types of memory, data storage, or computer-readable media, such as a first data storage for program instructions for execution by the processor 202, a separate storage for images or data, a removable memory for sharing information with other devices, etc. The device typically will include some type of display element 206, such as a touch screen or liquid crystal display (LCD), although devices such as portable media players might convey information via other means, such as through audio speakers. As discussed, the device in many embodiments will include at least one imaging element 208 such as a camera that is able to image a facial region of a user. The imaging element can include any appropriate technology, such as a CCD imaging element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

As discussed, the device also can include an orientation detection element 210 able to determine and/or detect orientation and/or movement of the device. Methods for using elements such as accelerometers to determine orientation or movement of a device are also known in the art and will not be discussed herein in detail. In some embodiments the device can include at least one additional input element 212 able to receive input from a user. This input element can include, for example, a push button, touch pad, touch screen, touch-sensitive material, wheel, joystick, keyboard, mouse, keypad, or any other such device or element whereby a user can input a command to the device. Some devices also can include a microphone or other audio capture element that accepts voice or other audio commands. For example, a device might not include any buttons at all, but might be controlled only through a combination of visual and audio commands, such that a user can control the device without having to be in contact with the device.

In situations where a user is using such a portable computing device, or any of a number of other types of device where a full keyboard or other traditional input approach is not available, practical, and/or desirable, conventional approaches to entering characters via an interface can be difficult to use or control, and can result in character entry that is not particularly precise. For example, cell phones often enable a user to enter characters by pressing one of the number keys on the keypad a certain number of times to reach the desired letter, but such an approach can be very time consuming. Some smart devices include conventional or "QWERTY" keyboards as known in the art, but for small portable devices these keys are often too small for many users to utilize effectively. Some devices with touch screens simulate full keyboards by enabling a user to 'type' by pressing the appropriate locations on the screen, but such an approach suffers a similar problem with the small size of the keys, but also can be very imprecise as a user cannot tell by touch which characters are actually being selected, resulting in the input of unintended characters. Some interfaces attempt to utilize auto-complete and/or auto-correct functionality to assist with such problems, but the suggestions are often both automatic and incorrect, which can be substantially frustrating for a user.

Systems and methods in accordance with various embodiments provide interfaces and other aspects useful for providing character, text, or other such input using a variety of different types of input that can be easier, faster, and/or more precise for various users. While many examples will be discussed with respect to portable devices, it should be understood that many aspects of the various interfaces can be used with conventional computing devices, such as personal computers, notebook computers, or gaming consoles, which might also have conventional methods of inputting text, etc.

Figure 3:
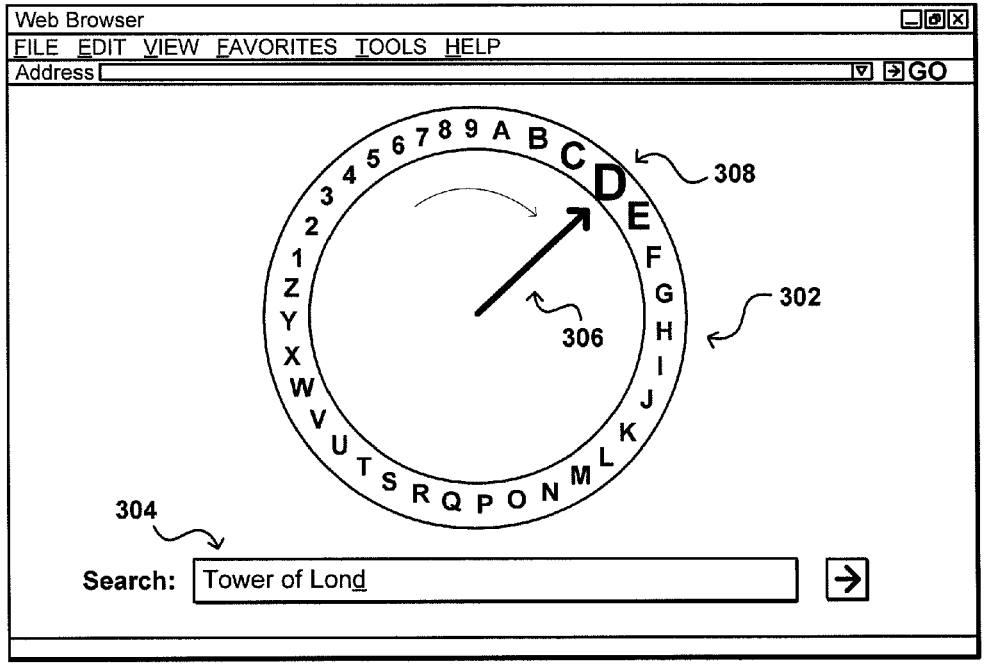
FIG. 3 illustrates an example interface enabling a user to select characters that can be used in accordance with a first embodiment.

FIG. 3 illustrates a first example interface 300 that can be used in accordance with various embodiments. In this example, the interface displays a circular arrangement of characters 302 and at least one indication element 306 for indicating the presently selectable character, although such an element may not be utilized in certain embodiments. In this example, a currently selectable letter 308, as indicated by the indication element, will also be shown substantially larger than the other letters on the selection wheel 302, although the letter could alternatively be highlighted, animated, or otherwise altered to indicate a currently selectable state. As can be seen, the letters substantially adjacent to, or within a given range or distance of, the currently selectable character 308 can also be enlarged (or otherwise altered) with respect to the other characters.

An advantage to the increased size of the currently selectable character 308 and a number of adjacent characters is that a user can obtain finer control over the specific characters desired. For example, if the currently selectable character in this example is the letter 'v,' which is substantially across the wheel from the desired letter 'd,' the user can quickly move an indication element 306 across the wheel to near the letter 'd.' It might be somewhat difficult, however, to accurately position the selection element directly on the desired letter when the letters are relatively small (e.g., the indication element might move between adjacent letters 'd' and 'e' based on relatively minor instabilities in the hand of the user). In this embodiment, the letters adjacent or otherwise near the current position of the selection element 306 are enlarged, and can also be somewhat shifted in space, such that the amount of selectable area corresponding to those letters is increased. A larger selection area for the letters means that less precision of the indication element 306 is necessary to select the intended letter 308.

In some embodiments, as will be discussed in more detail later herein, a user can provide input by tilting or otherwise changing a relative orientation of a portable computing device (such as that described with respect to FIGS. 1 and 2) corresponding to the displayed interface. In this case, the user can cause the indication element 306 (here the arrow) to quickly rotate towards the other side of the wheel by tilting the device in the corresponding direction. As the indication element nears the intended letter, the user can lessen the adjusted angle of the device (i.e., relative to a default orientation) in order to slow down the motion of the arrow. The increased letter size near the current position of the arrow can provide a finer level of control, such that the user does not have to be as precise in tilting the device to actually select the intended character when the intended character is within the range.

In order to actually select a currently selectable character, a user can perform any of a number of selection actions. In some embodiments, a user can perform a motion with respect to the device, such as quickly moving the device back and forth, issuing an audible command, performing a specific motion of a hand or head, etc. In some embodiments, a user can perform a selection action by pressing a button on a side or back of the device, as discussed above. In other embodiments, the user can perform a motion such as tapping or sliding a finger in any appropriate location on a touch-sensitive casing or area of the device. The ability of a user to perform a selection action using a single finger motion on a side or back of the device, in combination by selecting characters by changing an orientation of the device, for example, can enable a user to quickly and accurately enter text or other characters or input into the device while holding the device in one hand (although two-hand operation can be used as well as should be apparent).

In one example, a user tilts the device to locate a desired character, and performs a user action such as to tap the touch-sensitive case in order to select that character. If the user wants to capitalize a letter, view a character not currently displayed on the wheel, or perform another such action, the user can perform a different action with respect to the device. In some embodiments, the options to capitalize or view other characters can be displayed on the wheel itself. In other embodiments the user can perform another input motion with respect to the device. For example, the user might tap a finger on the case to select a letter, but to capitalize that letter might make a slight motion with a finger, such as to slide the finger in an 'up' motion on the back of the device. Other such actions can be used as input as well, such as to slide a finger down for a carriage return, forward for a space, back to delete the last character, etc.

In some embodiments the user might be able to control the selection element and other aspects of the interface by touch control, independent of any orientation-determining elements or imaging elements. For example, a user could move the arrow in FIG. 3 by sliding a position of the user's thumb on a wheel in a corner of a touch screen of the device. For example, if a user is right-handed the user can configure the wheel 302 to appear in the lower right-hand corner of the screen, or can have an input region in that corner of the screen, and can select characters by moving the arrow in association with a circular motion of the thumb on the device, and selecting by tapping the thumb on the touch screen. In some embodiments, the user can select the character by performing a motion or action with another finger, such as tapping the back of the device (or by entering an audible or visual command if those options are available). In some embodiments, the user can perform similar motions to provide input using a region of touch sensitive material on a back (or other surface) of the device. For example, a user holding the device with one hand could make a circular or other motion to move the selection element displayed on the display element, then could tap or perform another motion on the back of the device to perform a selection action. Many of the interfaces presented herein can be controlled purely through touch input on the exterior of the device, in addition or alternative to relative motion or other inputs or elements discussed with respect to these interfaces.

In other embodiments, as will be discussed later herein, the device also can track the gaze position of the user and determine the currently selectable characters based at least in part upon the gaze direction. The increased size of the letters near the currently selectable letter also can assist in more accurately determining the letter at which the user is looking. The user then can perform any of a number of other input actions, such as blinking or nodding, or performing another action as discussed herein.

Figure 4:
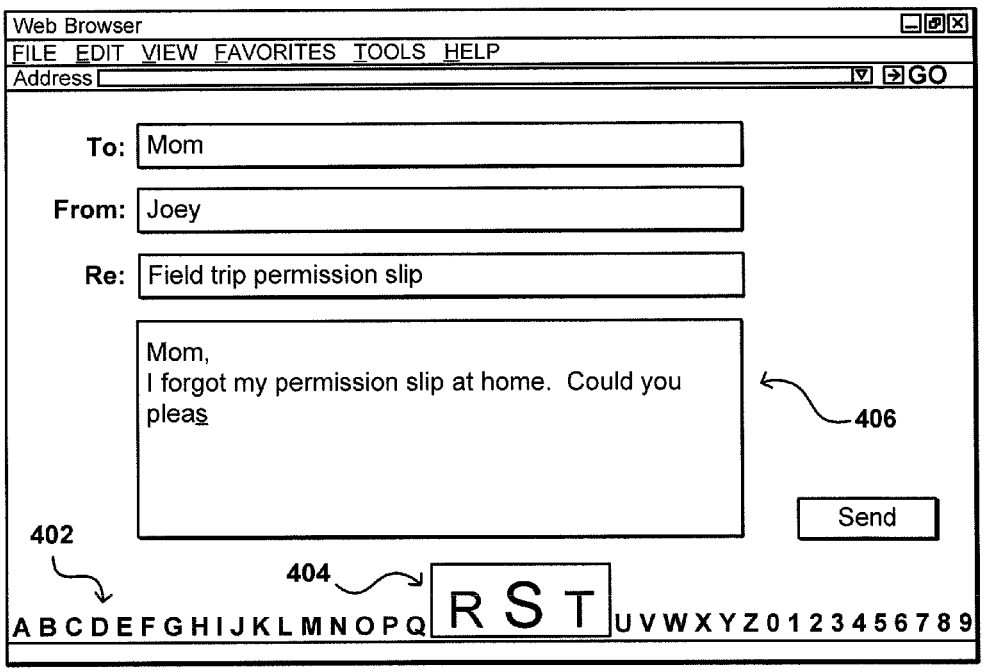
FIG. 4 illustrates an example interface enabling a user to select characters that can be used in accordance with a second embodiment.

FIG. 4 illustrates another example interface 400 that can utilize similar input control, but that utilizes a character bar 402 instead of a wheel as in the previous example. In this example, a user selects characters by tilting the device back and forth or otherwise providing input to move a position of the currently selectable character along the character bar. Again, the letters near the current selectable position can be increased in order to provide for more precise control.

In some embodiments, there can be a selection window 404 or similar element that can be moved back and forth along the character bar 402. The movement of the window can provide for a fast, coarse control whereby the user can quickly move to within a few characters of the desired character by tilting the device, or otherwise providing input, and then tapping or otherwise performing an action to 'lock' the position of the selection window. Once the window is locked, any movement or other input will only change the current selectable character within that window. This can provide a finer level of control, as the range of motion of the device can be limited to, or apportioned across, about three to five characters instead of the full character bar. When a user performs a selection action with respect to a character in the window, the window can automatically be unlocked in some embodiments to enable the user to move the box to the next letter. In some embodiments the user must perform another action to unlock the position of the box. For example, in the current example if the user wants to select the letter 't' after the letter 's' then it would be faster to allow the user to maintain the position of the box and enable the user to select the letter 't' without having to again lock the position of the box. Similar functionality can be obtained without actually displaying a window element, wherein a set of characters is instead enlarged corresponding to the coarse selection position.

In some embodiments, there can be more than two thresholds or ranges, and more than two speeds at which a selection element can move relative to the interface. In some embodiments, the rate at which the selection element moves across the interface is directly proportional, exponentially proportional, or otherwise related to the amount of tilt or other movement of the device, according to a substantially continuous function. In other embodiments, the rate of movement can be determined according to a step function or other function with a series of discrete values or ranges, wherein the selection element can move at any of a number of different rates based at least in part upon the input from the user. Various other relative motions can be utilized as well within the scope of the various embodiments, such as movement speeds that vary depending at least in part upon the portions or elements of the interface associated with a current position of the selection element.

Figure 5:
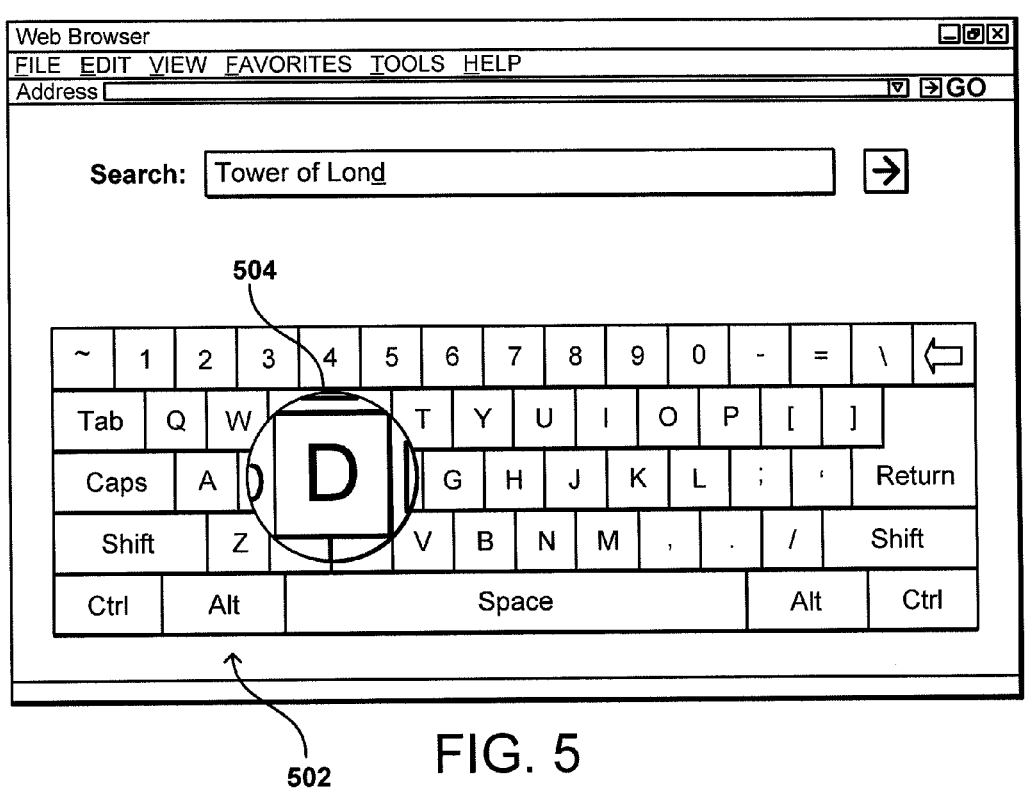
FIG. 5 illustrates an example interface enabling a user to select characters that can be used in accordance with a third embodiment.

In some cases, a user might be more comfortable selecting characters using more conventional approaches, such as are based upon a QWERTY keyboard, instead of having to get used to the positions of letters around a wheel, line, or other arrangement. FIG. 5 illustrates an example of an interface 500 that can be used with various input mechanisms discussed above in accordance with various embodiments. In this example, the characters are displayed using a layout 502 that is likely to be substantially familiar to many users. The selection element 504 can take any of a number of forms, but in this example appears as a clear marble or other such element that is able to 'roll' across the screen. Because users are able to correlate rolling of a ball with motion of a substantially planar element supporting the ball, the user can quickly and intuitively determine how to control the position of the selection element with respect to the virtual keyboard. Although primarily a single letter is shown by the selection element in this example, it should be understood that the selection element could show letters from a particular portion of the display, as may correspond to a direction the user is gazing or a direction in which the user is tilting the device, for example, in order to provide varying levels of control as discussed elsewhere herein. For example, the selection element could move to a certain region using coarse control, then allow the user to select within that region using fine control.

Figure 6A:
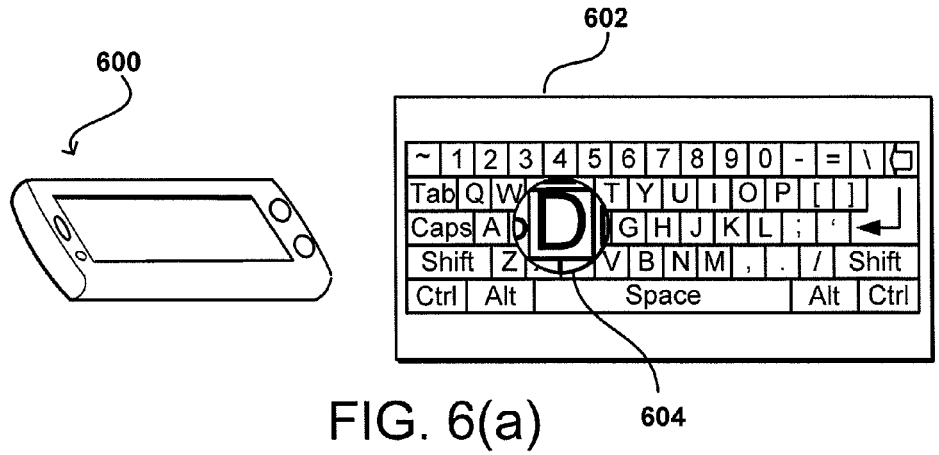
FIGS. 6(a)-6(c) illustrate approaches to controlling a selection element of an interface that can be used in accordance with various embodiments.
Figure 6B:
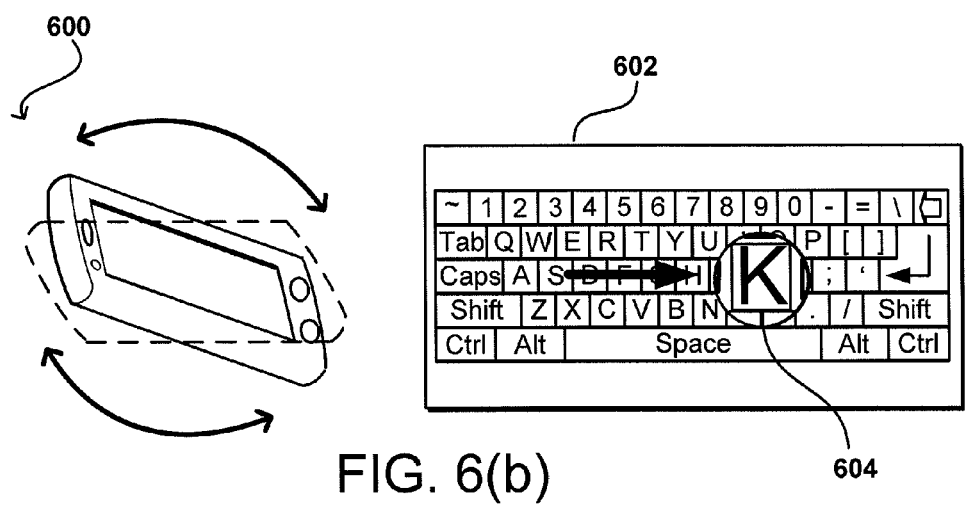
Figure 6C:
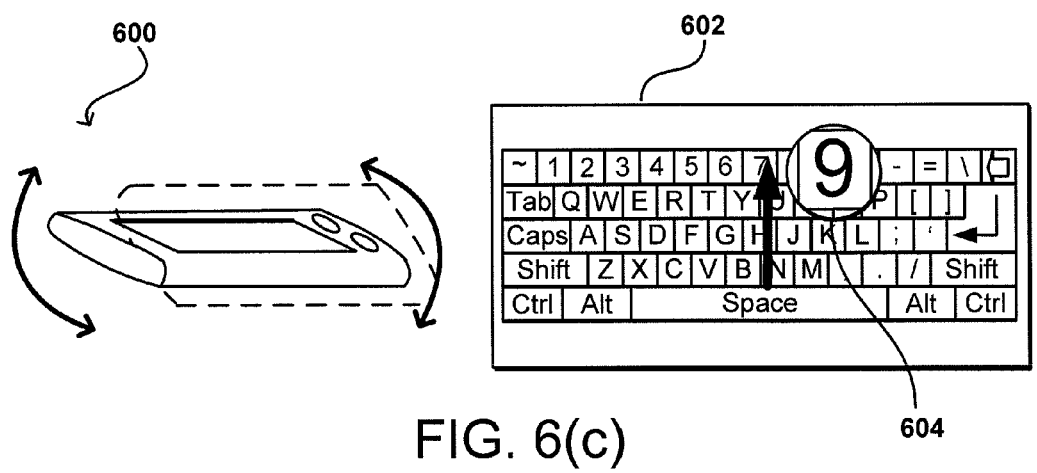

As illustrated in FIGS. 6(a)-(c), the selection element (here a virtual marble) can provide such coarse control in some embodiments by 'rolling' quickly across the keyboard image when the user tilts the device over a certain range of angle, or performs another such action. As seen between FIGS. 6(a)-6(b), tilting the device 600 in a first direction can cause the selection element 604 to move across the keyboard image 602 in a first direction, and as seen between FIGS. 6(b) and 6(c) tilting in a second direction can cause the selection element to move in a second direction. In some embodiments the selection element 604 can only move in one direction at a time, such as up and down or across, to provide a specific amount of control, while in other embodiments the selection element can move freely in any direction at any time. As the tilt angle (with respect to a default position) decreases, or a similar action occurs, the element in some embodiments can provide a finer level of control by rolling "into" slots corresponding to the letter "underneath" the marble. For example, as the user gets closer to the desired letter the speed of the marble can slow down and at some point the marble can "drop" into one letter at a time, which enables the user to move one letter at a time when near the desired letter, to provide for improved accuracy of input. Thus, the marble could roll freely across letters until the marble gets within a key or two of the desired letter, as controlled by the user, then can 'rest' on one key at a time until the user moves the marble to the desired key. Any appropriate selection action can be used as discussed elsewhere herein, and alternative approaches for moving the selection element 604 can be used as well as discussed elsewhere herein.

Figure 7:
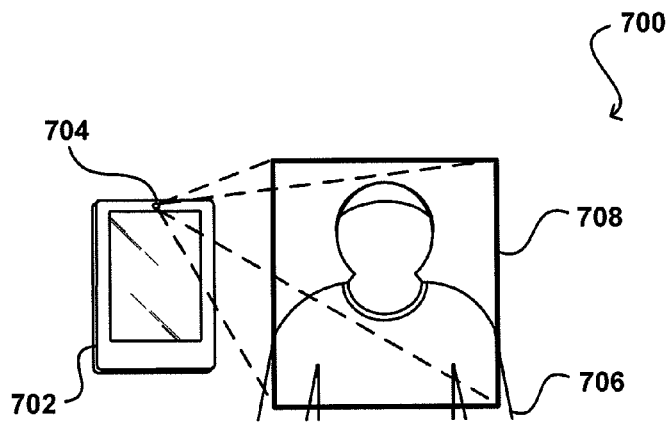
FIG. 7 illustrates an example approach to determining a relative orientation between a computing device and a user that can be used in accordance with one embodiment.

The relative motion of the device with respect to the user can also determined, at least in part, by using image capture and analysis in accordance with various embodiments. For example, FIG. 7 illustrates an example configuration 700 wherein a mobile device 702 includes a camera or other imaging element 704 that is able to capture an image of at least a portion of a user 706 of the device when the user is in front of the device (or at least within the viewing angle of an imaging element of the device), such as would normally occur when the user is viewing the display element of the device. It should be understood that the relative orientation of the user and the device shown in the figure is shifted for purposes of explanation, and that the user generally faces the front (or other face or side) of the device that includes a display element and the imaging element 704. The imaging element 704 may include, for example, a camera, a charge-coupled device (CCD), a motion detection sensor, or an infrared sensor, among many other possibilities. It should also be understood that, while a smart device 702 is depicted in this example, the portable computing device could be any appropriate device able to receive and process input commands, such as a personal computer, laptop computer, television set top box, cellular phone, PDA, electronic book reading device, video game system, or portable media player, among others.

In this configuration, the imaging element 704 is on the same general side of the portable device 702 as a display element, such that when a user is viewing the interface in the display element the imaging element has a viewable area 708 that, according to this example, includes the face of the user 706. While in some embodiments the imaging element is fixed relative to the device, in other embodiments the imaging element can be operable to track the position of the user, such as by rotating the imaging element or an optical element (e.g., a lens, mirror, etc.) that directs light to the imaging element. Although embodiments described herein use examples of the viewable area including the face of the user, the viewable area may include other portions of the body such as arms, legs, and hips, among other possibilities. In any case, the viewable area 708 of the imaging element can be configured to obtain image information corresponding to at least a portion of a user operating the device, and if the imaging element is continually (or at least substantially continually) capturing or otherwise obtaining image information, then any movement of the user 706 relative to the device 702 (through movement of the user, the device, or a combination thereof) can cause a position or orientation of at least one aspect of that user within the viewable area 708 to change. If the device includes software and/or hardware that is able to locate at least one feature of the user that can be consistently determined, such as the eyes, nose or mouth of the user, then the device can analyze the image information to determine relative motion over a period of time and utilize that relative motion as input.

For example, a user can tilt the device or rotate the user's head, such as to nod up and down, in a "yes" motion. Such motion can be detected and analyzed by the imaging element (e.g., camera) as the position of the user's eyes in the viewable area 708 will move in the images. Further, aspects such as the imaged shape, size, and separation of the user's eyes also can change. Movement of the eyes in the viewable area could also be accomplished by moving the device up and down while the user remains still, as well as through other such motions. In some embodiments, the device is able to distinguish between movement of the user and movement of the device, such as by detecting movement of a background or other aspect of the images, or by analyzing the separation, shape, or size of various features. Thus, in embodiments described anywhere in this description that use an imaging element to determine an orientation or location of the device relative to its user, a user can have an option of inputting a given type of motion, corresponding to a specific command, by moving the device or altering an aspect of the user, or both.

As described above, when using the imaging element of the computing device to detect motion of the device and/or user, the computing device can use the background in the images to determine movement. For example, if a user holds the device at a fixed orientation (e.g., distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation even though the orientation of the device with respect to the user has not changed.

In some cases, relative movement could be open to multiple interpretations. For example, in one application a device might be programmed to perform a first action if the device is moved up and/or down, and a second action if the device is instead tilted forward or backward. As should be apparent, each action can correspond to the position of the user's eyes moving up and/or down in the viewable area. In some embodiments, as will be discussed below, the camera and detection may be sensitive enough to distinguish between the two motions with respect to how the user's face changes in the captured images, such as the shape and separation of various features or other such aspects. In other embodiments, where it may be desirable for the process to utilize a fairly simple imaging element and analysis approach, it can be desirable to include at least one orientation determining element (e.g., an accelerometer or gyro) in the device that is able to determine a current orientation of the device 702. In one example, the at least one orientation determining element includes at least one single- or multi-axis accelerometer is used that is able to detect factors such as three-dimensional position of the device, the magnitude and direction of movement of the device, as well as vibration, shock, etc. Other elements for detecting orientation and/or movement can be used as well within the scope of various embodiments for use as orientation determining element. When the input from an accelerometer is used with the input from the camera, the relative movement can be more accurately interpreted, allowing for a wider range of input commands and/or a less complex image analysis algorithm. For example, use of an accelerometer can not only allow for distinguishing between lateral and rotational movement with respect to the user, but also can allow for a user to choose to provide input with or without the imaging element. Some devices can allow a user to specify whether input is to be accepted from the imaging element, the orientation determining element, or a combination thereof.

Figure 8A:
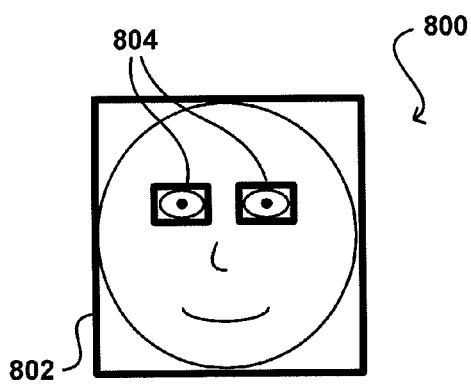
FIGS. 8(a)-8(d) illustrate examples of relative movements that can be recognized as input in accordance with one embodiment.
Figure 8B:
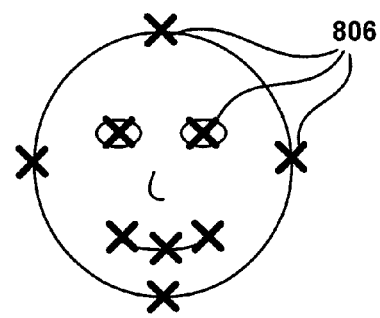

The device 702 can store, or otherwise have access to, at least one algorithm to analyze the captured images, as may be stored at least temporarily on the device itself, or can send the images to be analyzed by a remote computer or service, etc. Any of a number of algorithms can be used to analyze images, detect features, and track variations in the positions of those detected features in subsequent images. For example, FIG. 8(a) illustrates an example wherein an algorithm can analyze images to detect an approximate head location 802 in an image, and/or the relative position of facial features in the image, such as the approximate location of the user's eyes 804 in the image. Such information can be helpful to determine rotations of the user's head in addition to relative translations or movements with respect to the device. FIG. 8(b) illustrates an example that can be used with another algorithm, wherein the positions 806 of specific features of a user's face (or other body portion) are determined and tracked to detect changes in position in subsequent images. Tracking the relative motions can enable a user to provide input to the device by moving the user's head or body, moving the device, or a combination thereof.

Figure 8C:
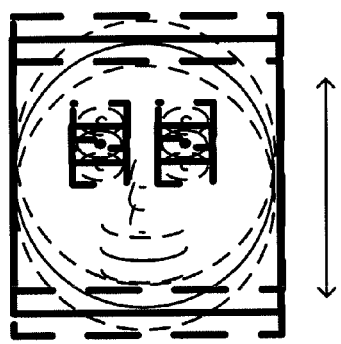
Figure 8D:
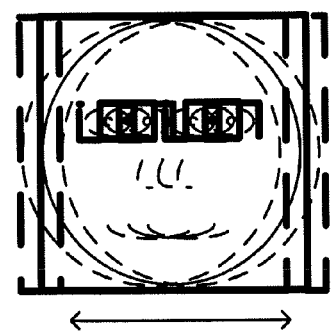

For example, FIG. 8(c) illustrates an example motion that could be captured by the device when either the user shakes the user's head up and down, rotates the device back or forward, or translates the device up and down, for example. FIG. 8(d) illustrates a similar example for side motion. By detecting any of these motions, or combinations thereof, using image capture, motion detection, or another appropriate technique, a user can provide input to the device to control rotation of the displayed content, or other such aspects, without requiring traditional input methods as discussed above.

Figure 9:
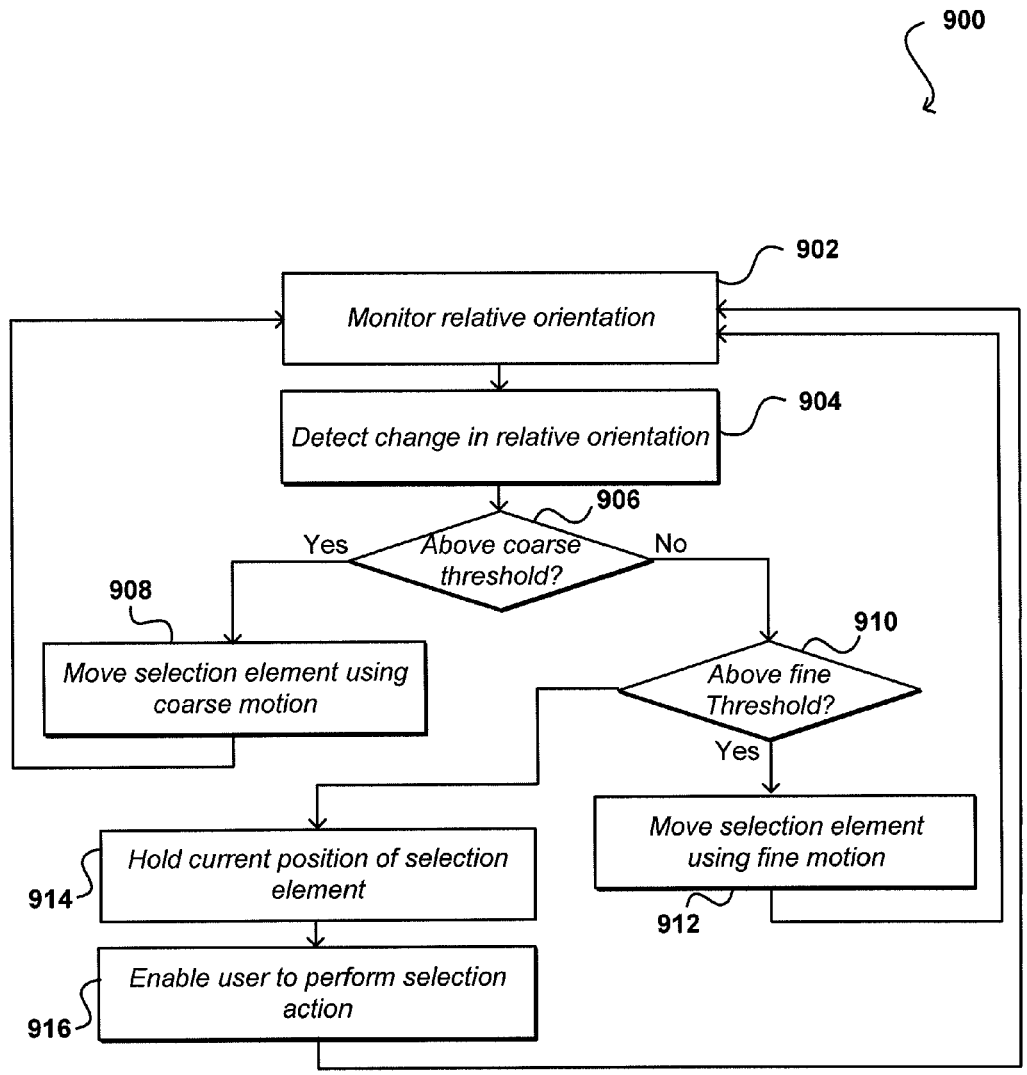
FIG. 9 illustrates an example process for selecting characters or other elements through an interface that can be used in accordance with various embodiments.

FIG. 9 illustrates an example process 900 that can be used to select alphanumeric characters or otherwise provide input that can be used in accordance with various embodiments. In this example, input from a user will be based at least in part of the relative orientation of the device with respect to the user, as a result of movement of the device, an aspect of the user, or a combination of both. As discussed elsewhere herein, various other types of input can be used as well within the scope of the various embodiments. Also, it should be understood that for any process discussed herein there can be additional, fewer, or alternative steps performed in similar or alternative orders, or in parallel, within the scope of the various embodiments. Further, while the process will be described with respect to selecting characters, it should be understood that such a process can be used to manipulate a cursor or other selection element across any appropriate type of element of a graphical user interface for purposes of selecting or otherwise triggering some action with respect to the interface.

In this example process, the relative orientation of a computing device is monitored with respect to a user, location, or other such aspect 902. The monitoring can be done continually in some embodiments, while in other embodiments an orientation determination is only made upon activation of an element such as an accelerometer. As discussed, the relative orientation, and changes in that orientation, can be determined using any appropriate element or combination of elements. When there is a change in a monitored orientation aspect, such as a movement of a user or device, the change in relative orientation is detected 904. A determination can be made as to the amount of change in orientation with respect to a previous or default orientation, such as to determine a rate of change in orientation, angular change in orientation, or other such determination. In some embodiments, the determination can also attempt to determine the type of change in relative orientation, such as whether detected movement corresponded to movement of the device or movement of the user.

The amount of change in orientation can determine at least one aspect of a user interface displayed or otherwise presented via the device. In this example, it is determined whether the change in orientation exceeds a coarse threshold 906 or a fine threshold 910. Although shown as separate steps in this example, it should be understood that the determination could comprise a single step, or steps in the opposite order. If the determined change exceeds a coarse threshold, such as a specific angular change of about ten degrees or more, the selection element can be moved in a corresponding direction using a coarse motion 908. As discussed, this can involve moving at a higher speed across an array of characters, moving across characters a group at a time, or performing a similar movement with a somewhat lower degree of control or accuracy but greater rate of change with respect to the characters. If the detected change in orientation is below the coarse threshold but above a fine threshold, such as an angular change of less than about ten degrees but greater than about one or two degrees with respect to a previous or default orientation, the selection element can be moved in a corresponding direction using a fine motion 912. As discussed, this can involve moving the selection element one character at a time or over a fixed subset or range of characters, or any other similar action disclosed or suggested herein.

If the detected change in orientation is less than the fine threshold, such as with respect to a default or "home" orientation, motion of the selection element might stop over the current character or other interface element. When the selection element is positioned over a character, the user can be enabled to perform a selection action 916, such as to select that character by pressing a select button on the device or otherwise performing or providing an appropriate input. It should be understood, however, that in other embodiments the selection element does not actually have to be at rest over a character, and that a user can perform a selection action any time the selection element is associated with a character or other interface element.

In some embodiments, a default or home orientation of the device can be updated over time. For example, a user might slowly change the position of the device over time due to fatigue, comfort, or other such reasons without intending to provide input to the device. Thus, the device might update the home position, or default frame of reference, when the change in orientation is less than a threshold amount over at least a minimum period of time. In other embodiments, a user might sit back, stand up, or otherwise change position, but the device might detect this change and, as long as the device maintains a substantially common relative position with respect to the user, the device can prevent inadvertent input and instead adjust the default orientation of the device. In some embodiments, large changes in orientation, such as a user standing up or setting the device down on a table, might not register input either, as the device can determine that the action exceeded a maximum change threshold and likely was not intended as input. Various other alternatives can be used as well within the scope of the various embodiments.

In some embodiments a user might have to activate an input in order to switch between coarse control and fine control, or any other such variation. For example, a device might have multiple buttons that a user can press, with at least one button used to toggle between coarse and fine control. For example, a user might press a first button to engage coarse control, move to a desired grouping of characters, then select the same button (or a different button) to engage fine control, whereby the user can navigate to the desired character. At the desired character, the user can select another button or perform an action to select the desired character. If the device instead has a touch-sensitive material on the exterior, the user can perform different motions contacting the device in order to engage the various modes and/or select characters or elements. If image capture is used, the user could perform various actions or movements to switch between modes, etc. Various other types of inputs can be used as well as discussed elsewhere herein.

For some user devices, such as hand-held devices with relatively small screens, it might not be practical to display a full keyboard in addition to the primary content being displayed, as the keyboard might be too small for the user to utilize effectively. In other cases, a user of a small device might not like the interaction needed to move back and forth along a line of characters, or utilize specific other interfaces discussed above. Accordingly, a number of variations can be utilized that can provide for motion or orientation-based character entry, taking into account the form factor, resolution, or other aspects of the device or preferences of the user to present an user interface that is desirable to the user.

Figure 10:
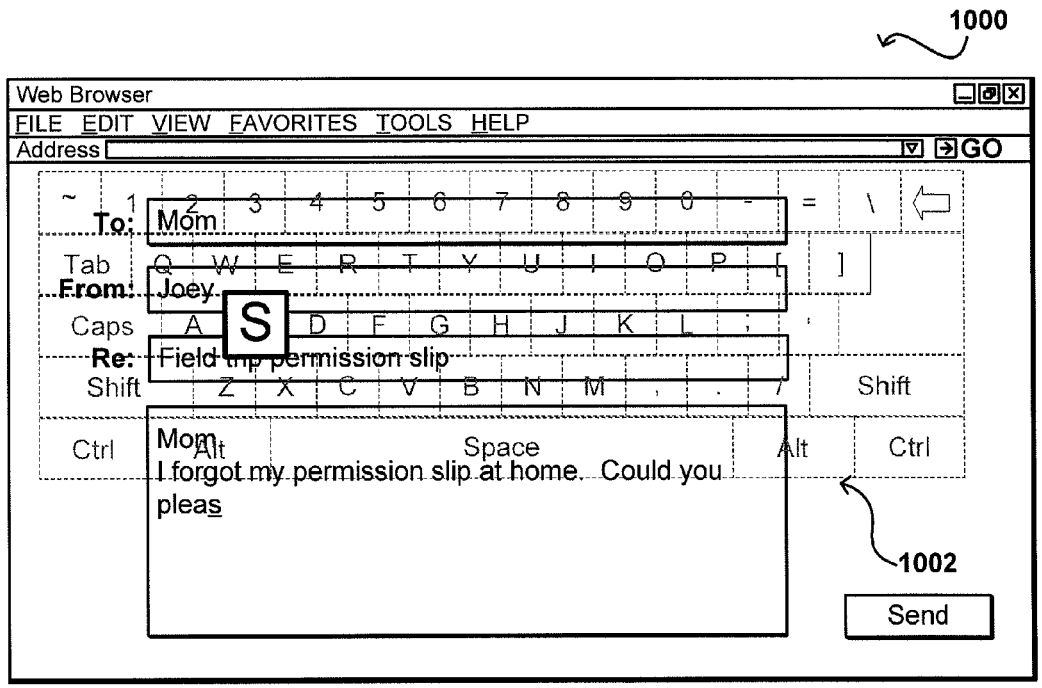
FIG. 10 illustrates an example interface enabling a user to select characters that can be used in accordance with a fourth embodiment.

For example, FIG. 10 illustrates an example interface 1000 wherein a virtual keyboard 1002 in presented overtop of at least a portion of the content displayed on the device. The keyboard can be at least partially transparent, such that the user can interact with the virtual keyboard while still being able to view the content displayed on the screen. In the figure, only the currently selectable character is displayed in a substantially opaque manner, or other manner indicating the currently selectable character. Thus, the majority of the content of the screen is still viewable even though the keyboard is also displayed. In some embodiments, the user must press a button or otherwise provide input for the keyboard to appear over the content. The user can then either provide another input for the keyboard to disappear from the display, or the keyboard can disappear automatically after some period of inactivity with respect to the keyboard. As should be understood, many of the approaches discussed herein can be used with a substantially transparent layer displayed on the device.

Figure 11:
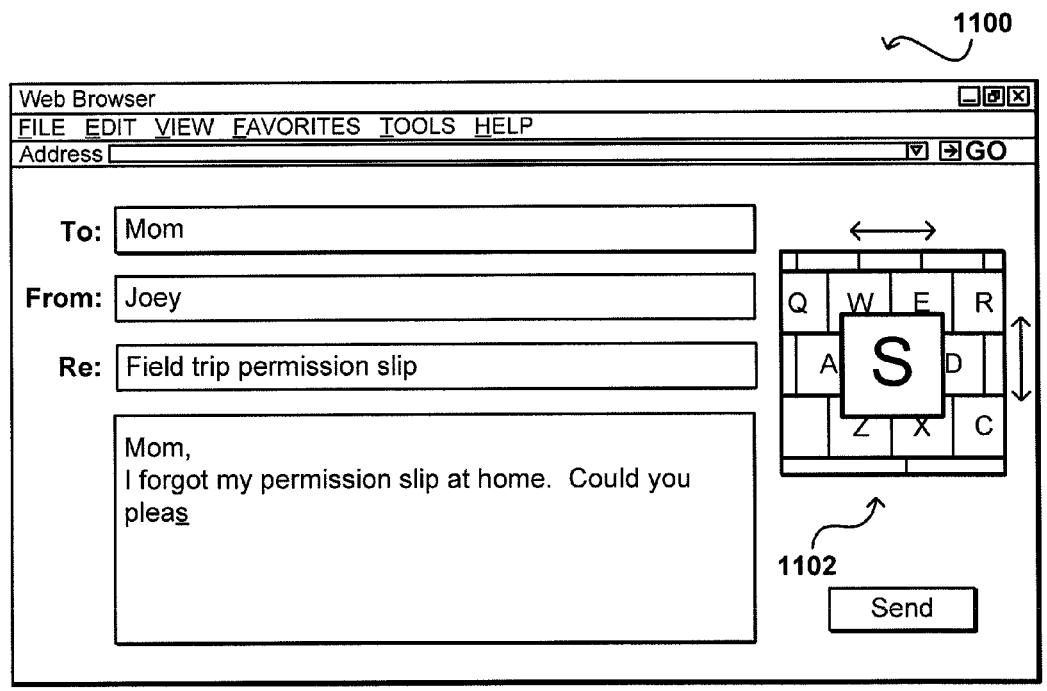
FIG. 11 illustrates an example interface enabling a user to select characters that can be used in accordance with a fifth embodiment.

FIG. 11 illustrates another example display 1100 that enables a user to utilize a familiar QWERTY keyboard layout while also conserving space on the device display. In this example, the interface includes a character selection window 1102 that shows only a portion of a keyboard at any time. The portion shown can change as the user changes the relative orientation of the device. In some embodiments, the window will "snap" to specific portion of the keyboard as part of a coarse control, and allow the user to select a character within that portion as part of a fine control. In other embodiments, the coarse control will relate more toward the speed at which the displayed portion of the keyboard shifts in the selection window 1102. In some cases, the user can press a button or otherwise "lock" the position of the keyboard in the selection window, at which point the device enables the user to select one of the characters displayed at the locked position. Various alternatives can be utilized as well.

Figure 12:
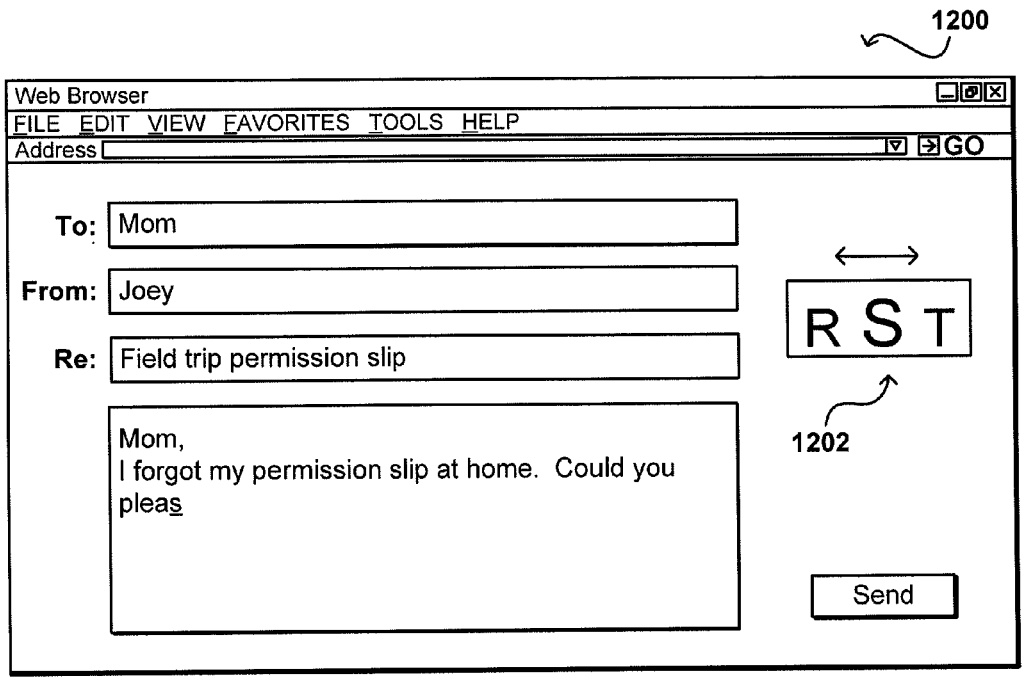
FIG. 12 illustrates an example interface enabling a user to select characters that can be used in accordance with a sixth embodiment.

In some cases, a user might not want to utilize a QWERTY layout when only a portion of the layout can be seen. FIG. 12 illustrates another example interface 1200 wherein the selection window 1202 utilizes a scrolling line of characters such as was described with respect to FIG. 4. As with other approaches discussed herein, there can be coarse and fine levels of movement that can be based upon different orientations, inputs switching between modes, or other such actions. The characters displayed might shift one at a time or in groups depending of the level of control or other such aspects.

Figure 13:
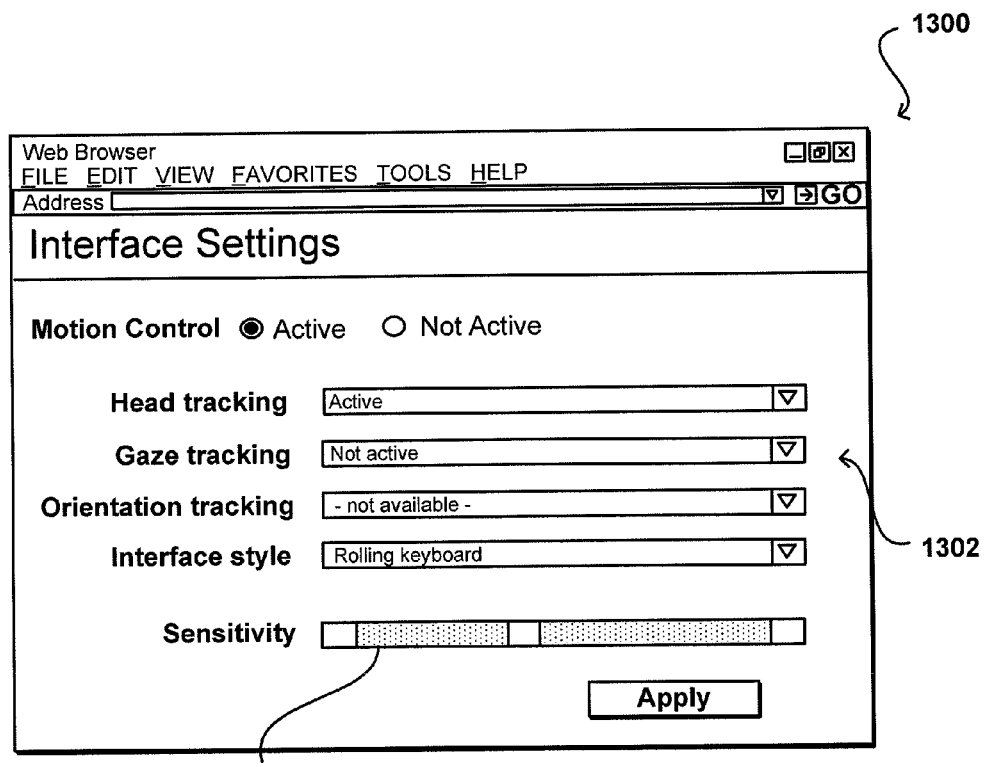
FIG. 13 illustrates an example of an interface page enabling a user to specify aspects of an interface that can be used in accordance with one embodiment.

In some embodiments, the user will be able to select or specify at least some of the aspects used for character or element selection, or other interface navigation. FIG. 13 illustrates an example display 1300 wherein a user can specify and/or select various aspects of interface control. As should be understood, the selection of user-selectable elements can vary between embodiments based upon factors such as the type of device, available components and software, etc. In this example, a user is presented with several different options 1302. A first option allows the user to enable or disable motion control, such as where a user would prefer to use traditional touch-screen input instead of motion control-based input. The user also can specify other settings, such as whether the device should use orientation tracking based on movement of the device (e.g., for portable devices) or based on changes in the imaged position of the user or the user's gaze position (e.g., for portable or stationary devices). In some embodiments, the interface will only present options that make sense for the user or device. For example, a stationary device without accelerometers or similar orientation-determining elements might not present a user with an option to control the interface based on motion of the device alone. Similarly, a device without a camera or imaging element might not present options to control based on user motion. In some cases, the user might also be able to specify the type of interface to be used, such as a rolling keyboard or scrolling character line, etc. A user also can be presented with other options, such as to adjust the sensitivity of the device. Adjustments in the sensitivity setting can affect aspects such as how much the user must tilt the device before a character selection element moves.

In some embodiments a user can select to utilize one of the interfaces discussed herein, but control a selection element using a conventional input mechanism. Using conventional interface approaches, for example, a user can input a direction by moving a mouse to drag a cursor in a particular direction across a screen, press arrows or other keys on a keyboard or keypad, move a trackball or touchpoint to input a direction of movement, or swipe a finger across a touch screen in a desired direction. Various other types of input can be received using any appropriate technique known or subsequently developed in the art for such purposes.

Further, specific motions on the device can be used to specify certain inputs. For example, when a device has a touch-sensitive casing the user can perform specific motions on the device to perform certain actions. For example, the character selection interface might be simplified to include mostly letters and numbers. For actions such as backspacing or inserting spaces, a user could perform an action such as to slide a finger in a direction on the back of the device to provide that input. For example, a user could slide a finger in a first direction on the back of the device to insert a space, and slide in the opposite direction to input a backspace. The user could swipe in a "down" direction for a carriage return, and an "up" direction to switch the case of the next letter. Various configurations are possible, which can help to increase the character entry speed of a user for a string of text or other such entry of information.

Further as discussed, gaze direction of a user can be used to control the position of a selection element in an interface. A user can look at the desired letter, and select a button, speak a command, tap the device, nod the user's head, or perform some other action to instruct the device to select that character. Further, a user's natural reaction to using gaze direction might be to subconsciously tilt the device a little bit if the current character does not exactly match where the user is looking, such that a combination of gaze and orientation determining can help to provide a finer level of control. If gaze tracking is sufficiently accurate, there might be no need for coarse and fine movements or similar approaches discussed herein.

In some embodiments where gaze tracking is utilized for character selection, it can be desirable to lock out certain functionality when the user is not looking substantially at the display. For example, if a user is not looking at the device, as determined by the gaze determination algorithm or other such component, the device can prevent a tap on the device as being interpreted as a selection of the current character indicated by a selection element, as the user would in general have no way of knowing which character was being inputted. When the user again looks back at the device, the device might need to recalculate a "home" position with respect to the user in order to properly interpret subsequent relative motion. Other elements such as light detection elements can be used to lock out certain actions, such that if a user places a device in the user's pocket or holds a cell phone up to the user's face, the light detection sensor can be blocked and thus can cause certain functionality to be temporarily disabled.

In other embodiments, the device might switch modes if the user is not looking at the device. For example, the device can switch to an audio mode wherein the device indicates via digitized speech the current letter corresponding to the selection element. Thus, the user can still tilt the device and select characters even while the user is not looking at the screen. Such an interface option also can be desirable in cases where the user is wearing certain types of glasses, there is insufficient light, or there is some other circumstance that prevent accurate gaze detection. In some cases, the sound can vary upon whether the device is in course or fine selection mode. For example, there can be a tone emitted when in course selection mode that changes in pitch based upon whether the current selection is near the beginning or end of the alphabet, with letters only being specifically called out when the device switches to fine selection mode.

Certain embodiments also can take advantage of any of a number of auto-complete functions known or subsequently developed for predicting words or character strings that the user is attempting to enter. In some embodiments, the suggestions can be displayed or otherwise conveyed by the device, and the user can select the suggested option by performing a specific action or input, such as by making a specific motion on the touch sensitive casing of a device. In some embodiments, the interface could temporarily "remove" certain characters from selection based upon the previously entered character(s). For example, if the user enters the letter "q" while typing a paragraph of text then the device might determine that the next letter will not be an "x" or "z" and thus might remove the letters from the viewing area, whereby the user can more quickly navigate to the intended letter.

Figure 14:
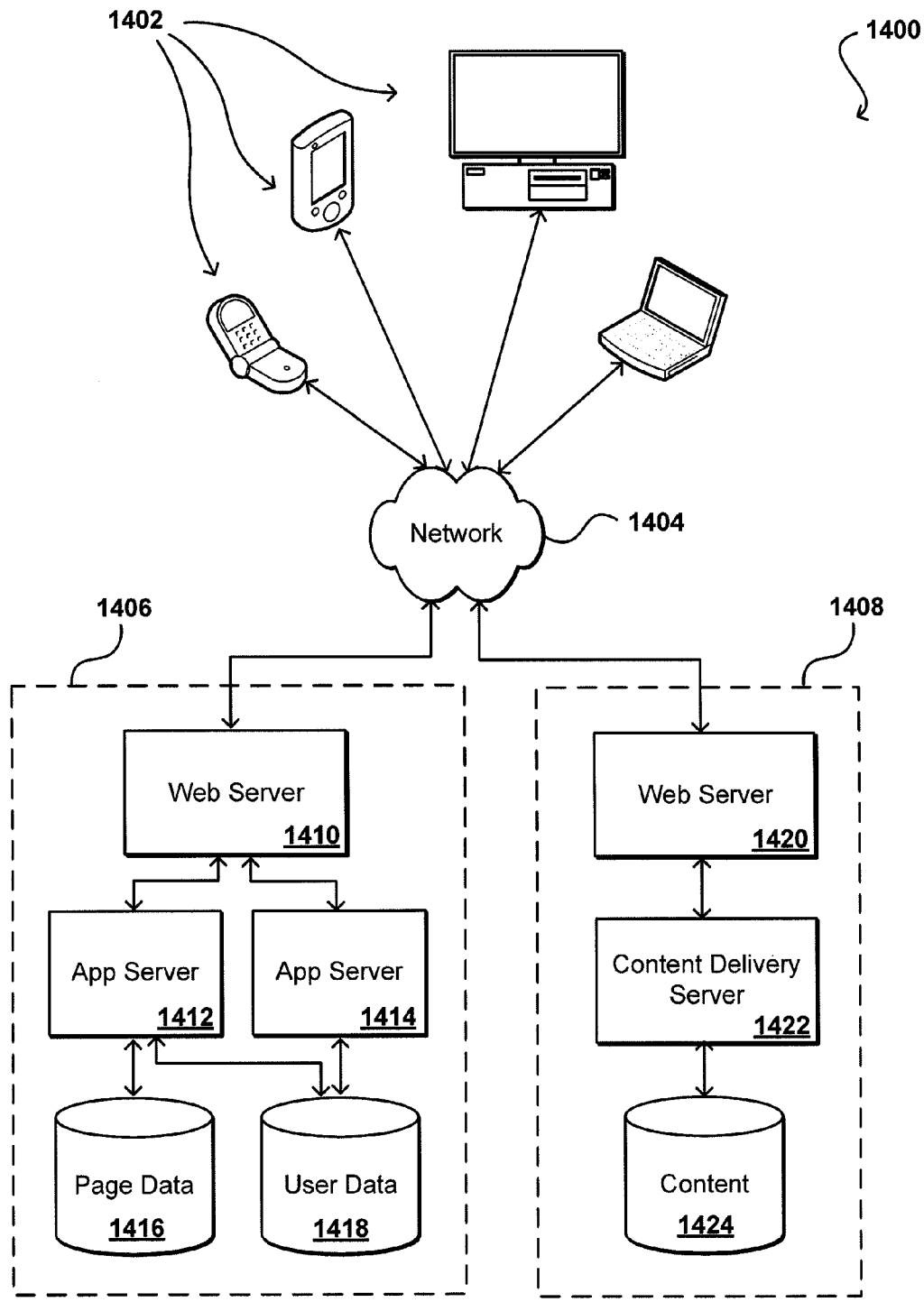
FIG. 14 illustrates an example an environment in which various embodiments can be implemented.

As discussed, various approaches can be implemented in various environments for various applications. For example, FIG. 14 illustrates an example of an environment 1400 for implementing aspects in accordance with various embodiments. As will be appreciated, although a Web-based environment is used for purposes of explanation, different environments may be used, as appropriate, to implement various embodiments. The environment 1400 shown includes a variety of electronic client devices 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. Each client device can be capable of running at least one motion or orientation-controlled interface as discussed or suggested herein. In some cases, all the functionality for the interface will be generated on the device. In other embodiments, at least some of the functionality or content will be generated in response to instructions or information received from over at least one network 1404.

The network 1404 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a primary content provider 1406 and a supplemental content provider 1408. Each provider can include at least one Web server 1406 for receiving requests from a user device 1402 and serving content in response thereto, although for other networks an alternative device serving a similar purpose could be used as would be apparent to one of ordinary skill in the art.

Each content provider in this illustrative environment includes at least one application server 1412, 1414, 1422 or other such server in communication with at least one data store 1416, 1418, 1424. It should be understood that there can be several application servers, layers, and/or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. An application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1402 and an application server, can be handled by the respective Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each data store can include several separate data tables, databases, or other data storage mechanisms and media for storing data relating to a particular aspect. For example, the page data store 1416 illustrated includes mechanisms for storing page data useful for generating Web pages and the user information data store 1418 includes information useful for selecting and/or customizing the Web pages for the user. It should be understood that there can be many other aspects that may need to be stored in a data store, such as access right information, which can be stored in any of the above listed mechanisms as appropriate or in additional mechanisms in the data store. Each data store is operable, through logic associated therewith, to receive instructions from a respective application server and obtain, update, or otherwise process data in response thereto. In one example, a user might submit a search request for a certain type of content. In this case, the data store might access the user information to verify the identity of the user, and can access the content information to obtain information about instances of that type of content. The information then can be returned to the user, such as in a results listing on a Web page that the user is able to view via a browser on the user device 1402. Information for a particular instance of content can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature, and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of enabling a user to provide input to an electronic device, comprising:
under control of one or more computing systems configured with executable instructions,
determining a default relative orientation of the electronic device using at least in part at least one imaging element of the electronic device, wherein the default relative orientation of the electronic device comprises a relative orientation of the electronic device with respect to an aspect of a user of the electronic device;
detecting a change in the relative orientation of the electronic device with respect to the default relative orientation, wherein the change in the relative orientation of the electronic device is with respect to the aspect of the user and is caused, at least in part, by a movement of the electronic device by the user, wherein the change in the relative orientation of the electronic device is detected using at least in part the at least one imaging element, and wherein the electronic device displays a plurality of selectable elements in a graphical user interface;
if the change in relative orientation meets or exceeds a coarse threshold, moving a selection element of the graphical user interface in a direction corresponding to a direction of the change in relative orientation at a first rate;
if the change in relative orientation meets or exceeds a fine threshold, but is less than the coarse threshold, moving the selection element in a direction corresponding to a direction of the change in relative orientation at a second rate less than the first rate;
if the change in relative orientation is less than the fine threshold but the detected relative orientation is different from the default relative orientation, maintaining a position of the selection element with respect to one of the selectable elements currently associated with the selection element; and in response to receiving a selection action, providing the selectable element currently associated with the selection element as input to the electronic device.

2. The computer-implemented method of claim 1, wherein the plurality of selectable characters comprise alphanumeric characters arranged in a substantially circular, substantially linear, or QWERTY keyboard layout.

3. The computer-implemented method of claim 1, wherein the change in relative orientation is determined using at least one of an orientation-determining element and an image capture element.

4. The computer-implemented method of claim 1, wherein the change in relative orientation is able to meet or exceed at least one additional threshold associated with at least one additional rate of movement of the selection element.

5. A computer-implemented method of enabling a user to provide input to an electronic device, comprising:

under control of one or more computing systems configured with executable instructions, determining a default relative orientation of the electronic device using at least in part at least one imaging element of the electronic device, wherein the default relative orientation of the electronic device comprises a relative orientation of the electronic device with respect to an aspect of a user of the electronic device;

detecting a change in the relative orientation of the electronic device with respect to the default relative orientation, wherein the change in the relative orientation of the electronic device is with respect to the aspect of the user and is caused, at least in part, by a movement of the electronic device by the user, wherein the change in the relative orientation of the electronic device is detected using at least in part the at least one imaging element, and wherein the electronic device displays a plurality of selectable elements in a graphical user interface;

moving a selection element of the graphical user interface in a direction corresponding to a direction of the change in relative orientation at a rate determined at least in part by an amount of the detected change in relative orientation, the amount being detected using at least in part the at least one imaging element, wherein a position of the selection element with respect to one of the plurality of selectable elements currently associated with the selection element is maintained in response to the detected relative orientation being different from the default relative orientation and the change in relative orientation being less than a fine threshold; and in response to receiving a selection action, providing the selectable element currently associated with the position of the selection element as input to the electronic device.

6. The computer-implemented method of claim 5, wherein the aspect of the user of the electronic device includes a physical aspect associated with at least one of a head of the user or a face of the user.

7. The computer-implemented method of claim 5, wherein the aspect of the user comprises a gaze direction of the user with respect to the electronic device, the selection element programmed to move in a direction and at a rate corresponding to a change in the gaze direction of the user.

8. The computer-implemented method of claim 5, wherein determining a default relative orientation of the electronic device includes locating a relative position of at least one object using at least one imaging element, the amount of change in the relative orientation of the electronic device being determined at least in part by monitoring a change in position of the at least one object in at least one image captured by the at least one imaging element.

9. The computer-implemented method of claim 5, wherein the selection action comprises at least one of pressing a button or interacting with a touch-sensitive material.

10. The computer-implemented method of claim 5, wherein the plurality of selectable elements correspond to alphanumeric characters, and wherein manipulation of the selection element through changes in relative orientation enable a user to input text using one-handed operation.

11. The computer-implemented method of claim 5, wherein the plurality of selectable elements are at least temporarily displayed over content displayed on the electronic device, the selectable elements being at least partially transparent with respect to the content.

12. The computer-implemented method of claim 5, wherein the graphical user interface provides at least two modes of control over the rate of movement of the selection element.

13. The computer-implemented method of claim 12, wherein the user is able to toggle between the modes of control by at least one of adjusting the relative orientation of the device or performing an input action with respect to the device.

14. The computer-implemented method of claim 12, wherein the electronic device comprises a touch sensitive material over at least a portion of an exterior of the electronic device, the user being able to provide a variety of inputs with respect to the graphical user interface using a plurality of different motions with respect to the touch sensitive material.

15. The computer-implemented method of claim 5, wherein the selection action is performed using a pressable button on a back or side of the device.

16. The computer-implemented method of claim 5, wherein the selection action is disabled when the user is not looking substantially at the electronic device.

17. The computer-implemented method of claim 5, wherein an input mode with respect to the graphical user interface changes when the user is not looking substantially at the electronic device.

18. The computer-implemented method of claim 5, wherein the selection element is moved at a rate determined at least in part using a continuous function or step function of the amount of the detected change in relative orientation.

19. A computer-implemented method of enabling a user to provide input to an electronic device, comprising:

under control of one or more computing systems configured with executable instructions, comprising:

determining a default relative orientation of the electronic device using at least in part at least one imaging element of the electronic device, wherein the default relative orientation of the electronic device comprises a relative orientation of the electronic device with respect to an aspect of a user of the electronic device;

detecting a change in the relative orientation of the electronic device with respect to the default relative orientation, wherein the change in the relative orientation of the electronic device is with respect to the aspect of the user and is caused, at least in part, by a movement of the electronic device by the user, wherein the change in the relative orientation of the electronic device is detected using at least in part the at least one imaging element, and wherein the electronic device displays a plurality of selectable elements in a graphical user interface;

moving a selection element of the graphical user interface in a direction corresponding to a direction of the change in relative orientation, wherein a position of the selection element with respect to one of the plurality of selectable elements currently associated with the selection element is maintained in response to the detected relative orientation being different from the default relative orientation and the change in relative orientation being less than a fine threshold; and in response to receiving a selection action, providing the selectable element currently associated with the position of the selection element as input to the electronic device.

20. A system, comprising:
a processor;
at least one imaging element;
a display element; and
a memory device including instructions that, when executed by the processor, cause the processor to:
   determine a default relative orientation of the computing device using at least in part the at least one imaging element, wherein the default relative orientation of the computing device comprises a relative orientation of the computing device with respect to an aspect of a user of the computing device;
   detect a change in the relative orientation of the computing device with respect to the default relative orientation, wherein the change in the relative orientation of the electronic device is with respect to the aspect of the user and is caused, at least in part, by a movement of the electronic device by the user, wherein the change in the relative orientation of the computing device is detected using at least in part the at least one imaging element, and wherein the computing device displays via the display element a plurality of selectable elements in a graphical user interface;
   move a selection element of the graphical user interface in a direction corresponding to a direction of the change in relative orientation at a rate determined at least in part by an amount of the detected change in relative orientation, wherein a position of the selection element with respect to one of the plurality of selectable elements currently associated with the selection element is maintained in response to the detected relative orientation being different from the default relative orientation and the change in relative orientation being less than a fine threshold; and
   in response to receiving a selection action, provide the selectable element currently associated with the position of the selection element as input to the computing device.

21. The system of claim 20, wherein the default relative orientation of the electronic device comprises a relative orientation of the electronic device with respect to an aspect of a user of the electronic device, the default relative orientation being determined at least in part using at least one imaging element of the electronic device.

22. The system of claim 21, wherein the aspect of the user comprises a gaze direction of the user with respect to the electronic device, the selection element programmed to move in a direction and at a rate corresponding to a change in the gaze direction of the user.

23. The system of claim 20, wherein the selection action comprises at least one of pressing a button or interacting with a touch-sensitive material on the computing device.

24. The system of claim 20, wherein the computing device comprises a touch sensitive material over at least a portion of an exterior of the computing device, the user being able to provide a variety of inputs with respect to the graphical user interface using a plurality of different motions with respect to the touch sensitive material.

25. A non-transitory computer-readable storage medium storing instructions for enabling a user to provide input to a computing device, the instructions when executed by a processor causing the processor to:
   determine a default relative orientation of the computing device using at least in part the at least one imaging element, wherein the default relative orientation of the computing device comprises a relative orientation of the computing device with respect to an aspect of a user of the computing device;
   detect a change in the relative orientation of the computing device with respect to the default relative orientation, wherein the change in the relative orientation of the electronic device is with respect to the aspect of the user and is caused, at least in part, by a movement of the electronic device by the user, wherein the change in the relative orientation of the computing device is detected using at least in part the at least one imaging element, and wherein the computing device displays a plurality of selectable elements in a graphical user interface;
   move a selection element of the graphical user interface in a direction corresponding to a direction of the change in relative orientation at a rate determined at least in part by an amount of the detected change in relative orientation, wherein a position of the selection element with respect to one of the plurality of selectable elements currently associated with the selection element is maintained in response to the detected relative orientation being different from the default relative orientation and the change in relative orientation being less than a fine threshold; and
   in response to receiving a selection action, provide the selectable element currently associated with the position of the selection element as input to the computing device.

26. The non-transitory computer-readable storage medium of claim 25, wherein the default relative orientation of the electronic device comprises a relative orientation of the electronic device with respect to an aspect of a user of the electronic device, the default relative orientation being determined at least in part using at least one imaging element of the electronic device.

27. The non-transitory computer-readable storage medium of claim 26, wherein the aspect of the user comprises a gaze direction of the user with respect to the electronic device, the selection element programmed to move in a direction and at a rate corresponding to a change in the gaze direction of the user.

28. The non-transitory computer-readable storage medium of claim 25, wherein the selection action comprises at least one of pressing a button or interacting with a touch-sensitive material on the computing device.

29. The non-transitory computer-readable storage medium of claim 25, wherein the computing device comprises a touch sensitive material over at least a portion of an exterior of the computing device, the user being able to provide a variety of inputs with respect to the graphical user interface using a plurality of different motions with respect to the touch sensitive material.

* * * * *